Sept. 6, 1966  B. FERNALD  3,270,643
PHOTOGRAPHIC APPARATUS
Filed April 20, 1964  3 Sheets-Sheet 1

INVENTOR.
Burleigh Fernald
BY Brown and Mikulka
and
Charles S. McGuire
ATTORNEYS Sept. 6, 1966  B. FERNALD  3,270,643
PHOTOGRAPHIC APPARATUS
Filed April 20, 1964  3 Sheets-Sheet 2

INVENTOR.
Burleigh Fernald
BY Brown and Mikulka
and
Charles S. McGuire
ATTORNEYS Sept. 6, 1966  B. FERNALD  3,270,643
PHOTOGRAPHIC APPARATUS
Filed April 20, 1964  3 Sheets-Sheet 3
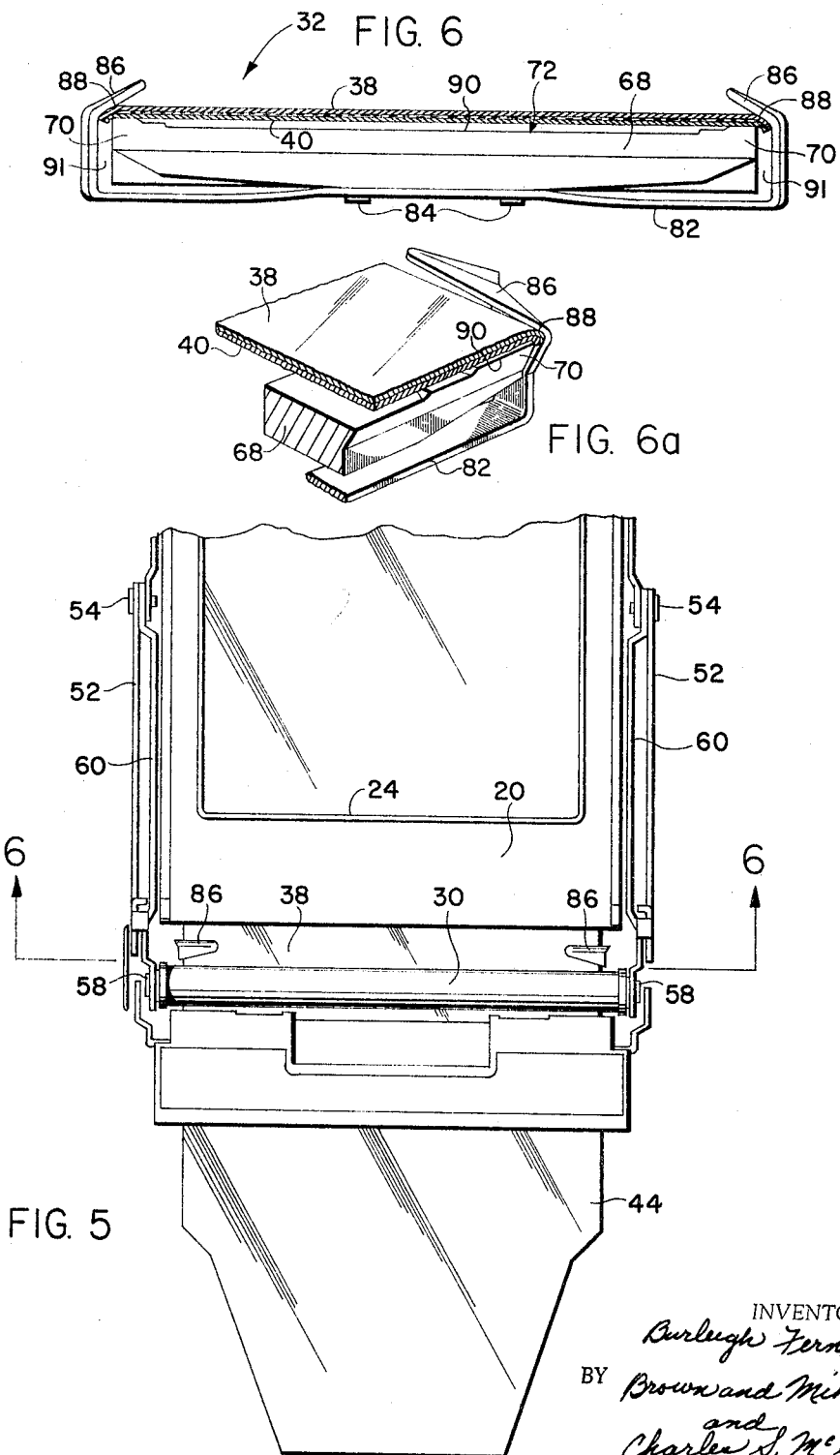

United States Patent Office 3,270,643
Patented Sept. 6, 1966

3,270,643
PHOTOGRAPHIC APPARATUS
Burleigh Fernald, Stratham, N.H., assignor to Polaroid Corporation, Cambridge, Mass., a corporation of Delaware
Filed Apr. 20, 1964, Ser. No. 360,861
13 Claims. (Cl. 95—13)

The present invention relates to photographic apparatus and, more specifically, to novel and improved apparatus suitable for incorporation with a camera to aid in the processing of photographic materials which have been exposed therein.

According to a well-known and widely used photographic process, a film unit including a photosensitive sheet, a second sheet and a contained processing fluid is advanced between a pair of pressure-applying members to effect release of the fluid and to spread it in a uniformly thin layer between the sheets. The photosensitive sheet has preferably been exposed to have a latent image formed therein prior to such advancement. Spreading of the liquid over the exposed surface of the photosensitive sheet effects development of the latent image, while the second sheet may aid in such development or, according to a preferred embodiment of the process, may have a positive image formed therein by the well-known diffusion transfer process.

The photosensitive and second sheets may be initially supplied in the form of continuous webs or rolls, each including a number of film units of the type described which may be successively severed from the remainder of the supply rolls as they are used. Alternatively, each film unit may comprise an individual photosensitive sheet and second sheet, each cut to the proper size and assembled for proper transport in superposition through the pressure-applying members prior to use. In the latter case it has been found convenient to supply a number of such individual film units in a magazine or film pack which may be loaded into a camera for successive exposure and processing of the film units. Either black-and-white or full-color images may be formed according to the subject process, the physical configuration and manner of transporting the film units through the apparatus being essentially the same for both. Where the film unit is an individual unit of a film pack, and where the unit possesses thickness variations and is drawn manually between pressure-applying means by a leader or tab, the movement should be continuous, essentially linear and at a generally constant speed. This is necessary to achieve an even spreading of the processing liquid and the production of an image of high quality, free from streaks or other blemishes which, it will be appreciated, may be particularly observable in a multicolored image as differences both of density and color rendition.

Various expedients have been employed to provide suitable film units and to insure their proper transport through the processing apparatus in order to carry out the subject photographic process in an acceptable manner and to produce a photographic print of optimum quality. Certain structures relating thereto have been described, for example, in U.S. Patents 3,080,805, issued to Joel A. Hamilton on March 12, 1963, 3,079,849, issued to Richard R. Wareham on March 5, 1963, and 2,991,703, issued to Vaito K. Eloranta on July 11, 1961, and in copending U.S. applications Serial Nos. 203,265 and 268,882 of Rogers B. Downey filed, respectively, on June 18, 1962 and March 29, 1963, now Patents Nos. 3,132,572 and 3,165,039, and 365,868 of Patrick Finelli, filed May 6, 1964. The present invention is directed toward improved means of the general character alluded to above which are suitable for incorporation in a compact, commercially acceptable camera.

In accordance with the foregoing considerations, it is a principal object of the present invention to provide improved apparatus for assisting in the proper processing of a film unit of the type adapted to be advanced through pressure-applying means to effect release and spreading of a processing fluid between a pair of sheets of the film unit.

A further object is to provide apparatus of the character described wherein longitudinal marginal edge portions of a film unit are constrained to prevent escape of a processing fluid which is spread between a pair of sheets of the film unit without appreciably affecting the configuration of the remainder of the unit.

Still another object is to provide guide means which establish the plane of a film unit as the latter is advanced between a pair of pressure-applying members while at the same time preventing escape of a processing fluid from the lateral edges of the unit by compressing the edges in a scissor-like manner.

A still further object is to provide, in combination with pressure-applying means through which a film unit is advanced to effect release and spreading of a processing fluid between a pair of sheets, means for slidingly engaging the edges of said sheets as the unit is advanced, thereby crimping the edges out of the general plane of advancement of the unit without applying undesirable external pressure to the remainder of the unit.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 5 is a plan view showing an operational stage of the apparatus of the invention;

FIG. 6 is a front elevational view in cross section on the line 6—6 of FIG 5; and FIG. 6a is an enlarged, fragmentary, perspective view of a portion of the apparatus of FIG. 5.

Figure 1:
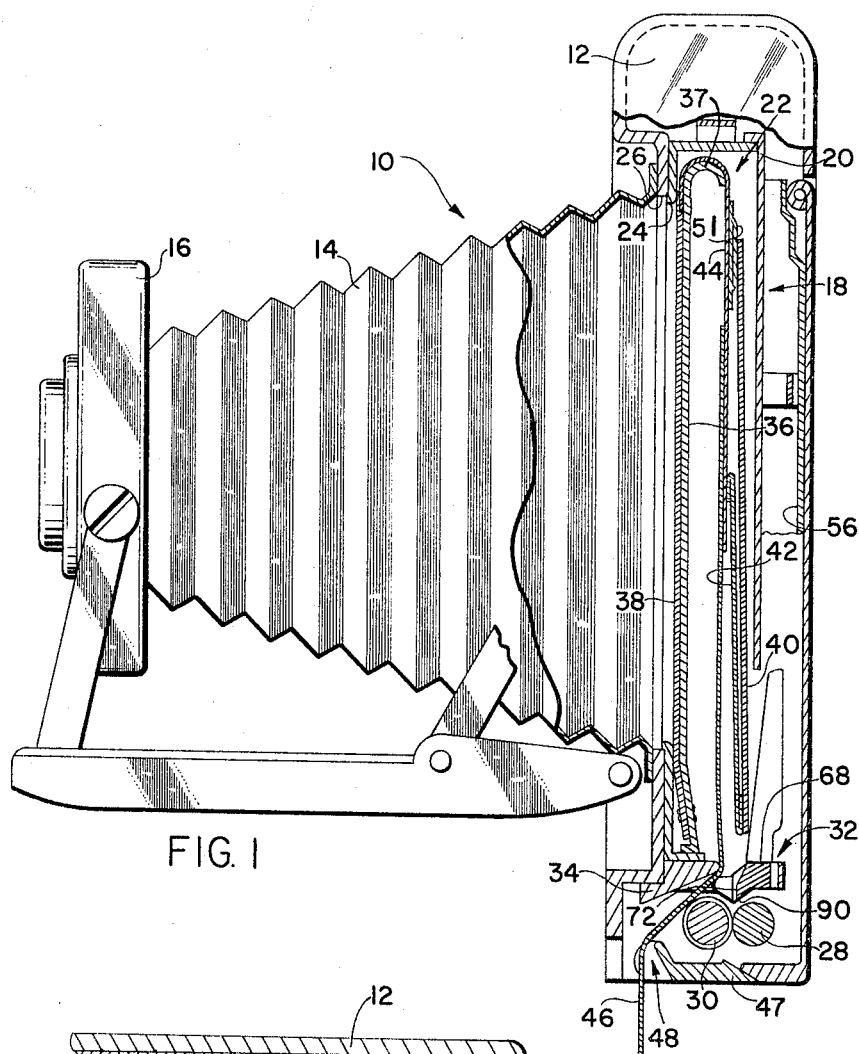
FIGURE 1 is a side elevational view, partly in cross section, of a self-developing camera embodying the processing apparatus of the present invention.

Referring now to the drawings, in FIGURE 1 is shown a self-developing camera, indicated generally by reference numeral 10, and including camera body 12, bellows 14, lens and shutter housing 16 and the usual braces and supports for maintaining the various elements in operational relation to one another. Camera back 12 is adapted to receive film pack 18 which includes a magazine or container 20 and a plurality of film units 22, only one of which is shown in the drawing. Container 20 includes a frontal exposure aperture 24 which is aligned with a like aperture 26 in the camera body when film pack 18 is mounted therein. Camera 10 additionally includes processing apparatus including pressure rolls 28 and 30, edge-engaging and guide means 32 and tab guide bar 34.

Although the film pack and individual film units thereof constitute no part of the present invention, they will be described in some detail to make clear the operation and function of the processing apparatus. Pressure plate 36 is positioned within container 20 and holds photosensitive sheet 38 of film unit 22 flat in the focal plane of camera 10. Accordingly, photosensitive sheet 38 is located adjacent opening 24 of container 20 and exposure opening 26 with its photosensitive emulsion at a correct position for photographic exposure. Other elements of the film assembly include a second, preferably image-receiving, sheet 40 positioned on the opposite side of pressure plate 36 from photosensitive sheet 38 and connected thereto by flexible strip 42 and leader 44. Tab 46 is initially attached to leader 44 and extends out of container 20, over tab strip bar 34 and out of the camera through exist aperture 48. As initially supplied, the film pack includes a safety cover (not shown) completely covering the frontal aperture 24 of container 20, thus protecting the photosensitive sheets from actinic light, and having a leader which initially extends through exist aperture 48. After mounting the film pack within the camera, the safety cover may be removed by pulling on the leader. Tab 46 of the first film assembly is releasably attached to the safety cover and is pulled out, and finally separated from, the latter so as to extend through aperture 48 after the safety cover has been removed and discarded. Film unit 22 further includes container 51, of the type disclosed in U.S. Patent No. 2,543,181, releasably holding a processing liquid, its release being effected by rupture of the container in a predetermined area upon compression of the container between pressure rolls 28 and 30.

In FIGS. 2–5 the processing apparatus and associated elements are shown in greater detail. A carriage or support frame 50 serves as a basic support means for mounting the aforesaid edge-engaging and guide means 32 and pressure roll 28. Side support members 52 of support frame 50 are pivotally attached by bearing means 54 to mounting plate 56 which in turn is rigidly attached to the interior of camera back 12. Pressure roll 30 is rotatably mounted by means of bearings 58 adjacent one end of arms 60 which are pivoted at their other end upon bearing means 54. Appropriate spring means and latch means (not shown in detail) are provided for biasing pressure roll 30 towards roll 28 and for releasably retaining the two rolls in engagement with one another.

A pair of plate-like members 62 are mounted by means of rivets 64 on support frame 50 at either side of a central, longitudinally extending, depressed or grooved area 66. Further referring to the edge-engaging means 32, there is included a multifaced bar member 68, having at each end a raised boss 70, an essentially flat support center section 72 and inclined rear center and side section 74. The assembly further comprises an integral mounting means for bar 68 including a pair of ears 76 and a pair of parallel arms 78 joined by cross piece 80. An elongated bowed, spring-like element 82 is attached by means of rivets 84 to bar elements 68. As best seen in FIG. 6, spring element 82 is bent outwardly away from bar element 68 on each side of rivets 84, and then curved around end portions 70 of the bar element, terminating in ears 86 which extend inwardly at an angle with respect to guide surfaces 85 of the bar element end portions 70. The bias provided by the configuration and resiliency of spring 82, maintains the inner portions of ears 86 in contact with outer lateral edge areas of end portion 70. In addition to spring 82 being bent along its longitudinal axis to form ears 86, the latter are also inclined in the transverse plane, as shown in FIG. 6a, whereby an essentially point contact between the spring and bar elements is achieved. This point contact, indicated at 88, is near the lateral edges of end portions 70 nearest the pressure rolls. It will also be noted that leading lateral edge 90 of bar element 68 extends towards the bite of the pressure rolls so as to be positioned closely adjacent thereto, and surfaces 85 lie in a plane passing through the bite of the rolls and perpendicular to a plane passing through the longitudinal axes thereof.

Bar element 68, with spring element 82 assembled thereon as above described, is mounted on a block element 92 by means of shaft 94 which passes horizontally through the ends of arms 78 and through bearing means 96 which is affixed to block 92. A pair of compression springs 98, mounted on shaft 94 between opposite sides of bearing means 96 and arms 78, exerts a force sufficient to maintain bar element 68 substantially centered horizontally, but to permit some lateral movement thereof. Shaft 94 is preferably round in cross section and is inserted through somewhat elongated or elliptical openings in arms 78, and fits loosely through bearing means 96. The combination of the above-described mounting means will be understood as providing a substantially complete freedom of movement of bar element 68, limited only by the dimensional considerations and the slight spring bias required to maintain a normal rest position.

Cover plate 100 is secured to block element 92 by means of screws 102 which are treated into openings 104 in the block. The inner opposed edges 63 of plate-like elements 62 form, in combination with groove 66, a pair of tracks upon which block element 92 is slidably mounted. Thus, the assembly comprising block element 92, bar element 68, spring element 82, and cover plate 100 is movable with respect to support frame 50 along tracks 63. This assembly is normally maintained in a forward position, that is, biased toward the pressure rolls, by means of spring 106 which is attached at one end to support frame 50 and at the other end to a portion of block element 92. Movement of the assembly toward the pressure rolls is limited by linkage 108 which is rotatably attached at one end to loop 110 extending fixedly from mounting plate 56 and, at the other end, to a bracket (not shown) extending from cover plate 100. Loop 110 is positioned somewhat closer, longitudinally, to the pressure rolls than are the pivot points at bearing means 54. This differential positioning of pivot points at 110 and 54 causes the assembly comprising block 92, bar 68 and cover plate 100 to slide upon tracks 63 in a direction away from the pressure rolls, against the biasing of spring 106, when support frame 50 is rotated about bearing means 54. When the support frame is again moved to the closed position relative to mounting plate 56, spring 106 again causes sliding movement of the block, bar and cover plate assembly towards the pressure rolls to the extent permitted by link 108.

Figure 3:
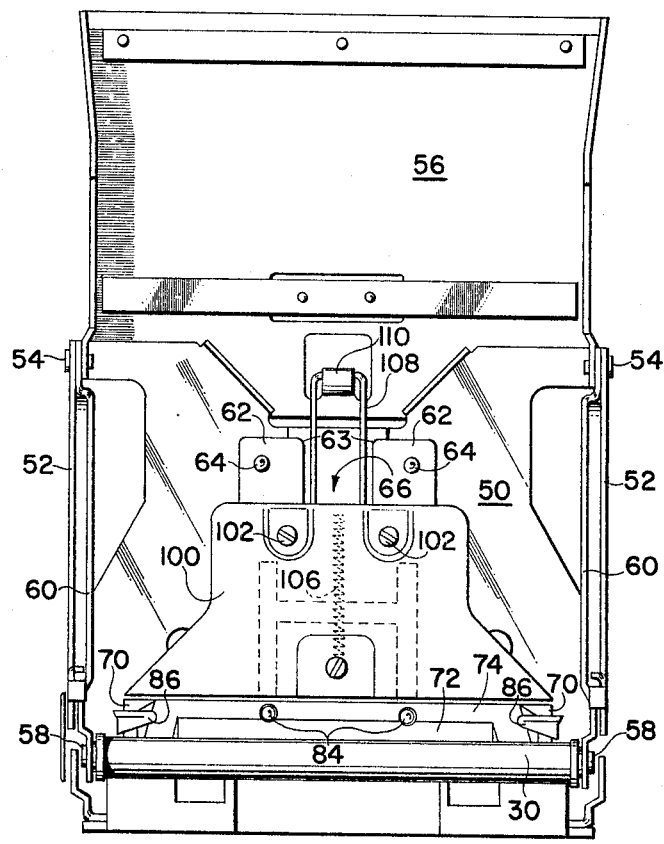
FIG. 3 is a plan view of a portion of the interior of the camera of FIGURE 1.

Ears 76 on bar element 68 are positioned under cover plate 100, as seen in FIG. 3, thus establishing a vertical rest position of the bar element which is spring biased about its pivotal mounting on shaft 94 towards engagement of the ears with the cover plate.

The function of the apparatus of the invention relative to a film unit of the type described, as particularly illustrated in FIGS. 1, 2, 5 and 6, will now be described. Film unit 22 is positioned within container 20 and the latter is mounted within camera body 12 as shown in FIGURE 1 with tab 46 extending out of the container, over tab guide bar 34 and out of exit aperture 48, bypassing the pressure rolls. After photographic exposure of photosensitive sheet 38 through the usual operation of the came shutter, tab 46 is pulled manually to perform a first stage of advancement of film unit components. Due to the direct attachment of tab 46 with leader 44, and attachment of the latter with photosensitive sheet 38, manual advancement of tab 46 causes photosensitive sheet 38 to be advanced around the curved end 37 of pressure plate 36. The end of flexible strip 42 which is attached to leader 44 will be advanced toward the pressure rolls. Second sheet 40 remains stationary during the first stage of advancement since flexible strip 42 has been folded back on itself as shown in FIGURE 1 and will not exert a pulling force on the second sheet until the fold or slack has been removed. Should the frictional forces exerted by leader 44 and photosensitive sheet 38 on second sheet 40 tend to advance the latter toward the pressure rolls, the leading edge of the second sheet will contact end portions 70 of bar element 68 and restrain the sheet against further movement. A portion of the manual pulling force exerted on tab 46 is applied to closure element 47. The latter element is pivotally mounted and is rotated by the force applied from tab 46 about its pivotal mounting to an open position with respect to a second exit aperture 49, shown in FIG. 2.

Figure 2:
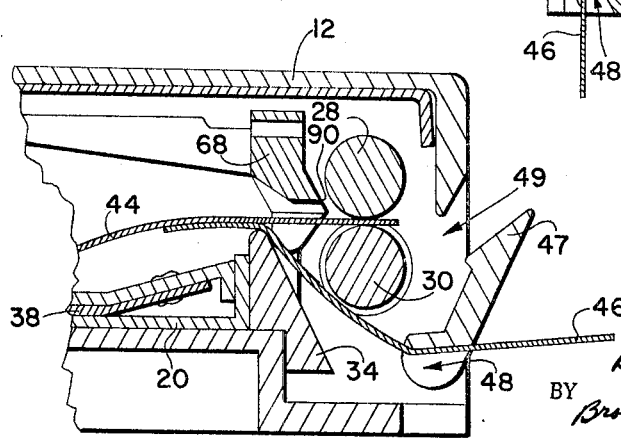
FIG. 2 is an enlarged, fragmentary view, in cross section, of a portion of the apparatus of FIGURE 1, showing its relation to a film unit being advanced therethrough.
Figure 4:
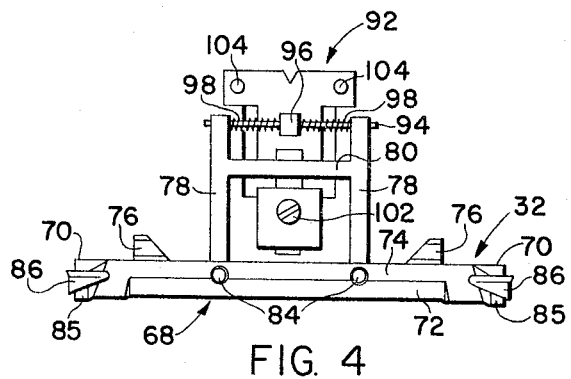
FIG. 4 is a plan view of certain elements shown in FIG. 2.

Since the direct attachment of tab 46 with leader 44 is somewhat behind the leading edge of the latter element, continued advancement of tab 46 causes substantially linear advancement of the leading edge of leader 44 toward the bite of pressure rolls 28 and 30, rather than toward exit aperture 48. As shown in FIG. 2, leader 44 is advanced between the pressure rolls and when the point of attachment of tab 46 with leader 44 approaches tab guide bar 34 the direction of the pulling force on tab 46 relative to this point of attachment is divergent with respect to the direction of advancement of leader 44. Thus, tab 46 will be separated from leader 44 and may be withdrawn from the camera through exit aperture 48 and discarded. Photosensitive sheet 38 has now been drawn completely around pressure plate 36 into superposition with second sheet 40. The fold or slack has been removed from flexible strip 42 and the leading edge of leader 44 extends through the bite of pressure rolls 28 and 30 and out of the camera through exit aperture 49. Leader 44 may now be grasped and pulled manually to perform a second or processing stage of advancement of the film unit.

Advancement of leader 44 causes continued advancement of photosensitive sheet 38 and flexible strip 42. Since the slack has been removed from strip 42, which is directly attached to second sheet 40, a direct pulling force is also exerted on the second sheet. The distance between the attachments of flexible strip 42 with leader 44 and with second sheet 40 is substantially the same as the distance between the attachment of the flexible strip with the leader and the attachment of the leader with photosensitive sheet 38. Thus, the leading edges of photosensitive sheet 38 and second sheet 40 are substantially aligned with one another. Container 51 is positioned between leader 44 and flexible strip 42 slightly in advance of the leading edges of the photosensitive and second sheets, and is ruptured along a trailing edge as it is advanced between pressure rolls 28 and 30, thus dispensing the processing liquid toward the exposed surface of the photosensitive sheet. The leading edge of second sheet 40 which has contacted end portions 70 of bar element 68 as previously described, may now be drawn past the end portions since a positive pulling force is applied rather than merely frictional force, as is the case before the slack has been removed from flexible strip 42.

It will be noted that the edges of end portion 86 of spring element 82 are flared outwardly with respect to end portions 70 of bar element 68 along the edges facing away from the bite of the pressure rolls. An entrance area for the marginal edge portions of the film unit is thus formed by end portions 86 and 70 of the spring and bar elements, respectively, for guiding marginal edge portions of the film unit between the end portions prior to entering the bite of the pressure rolls. As previously mentioned, and as particularly shown in FIG. 6a, end portions 86 of spring element 82 are urged towards engagement with end portions 70 of bar element 68, the end portions of the spring element being so formed as to tend to contact the end portions of the bar element substantially at single points, these points being located on lateral edges of the end portions of the bar element near the leading edge thereof. Since the width of bar element 68 is slightly less than that of sheets 38 and 40 of the film unit, marginal edge portions of the two sheets will overhang the outer edges of the bar element, as shown in FIG. 6. The configuration of spring element 82 as it passes around end portions 70 of the bar element is such that spaces 91 are provided between the inner surfaces of the spring element and the outer surfaces of the bar element to accommodate the marginal edge portions of sheets 38 and 40 which overhang bar element 68.

It is again pointed out that leading edge 90 of bar element 68 extends to a position closely adjacent the bite of the pressure rolls, and surfaces 85 on end portions 70 lie substantially in a plane passing through the bite and perpendicular to a plane passing through the longitudinal axes of the rolls. Preferably leading edge 90 is positioned within the radius of the pressure rolls; that is, the leading edge is closer to the bite of the rolls than is any point on a plane tangent to both rolls. Also, points 88 at which end portions 86 of the spring element are urged towards engagement with end portions 70 of the bar element are closely adjacent leading edge 90, whereby the point at which each of the marginal edges of sheets 38 and 40 are bent out of the general plane of advancement of the sheets is closely adjacent the bite of the pressure rolls. It is also important to note that no external forces are applied to either of sheets 38 or 40 in the areas between the engaged marginal edge portions thereof just prior to advancement of the sheets between the pressure rolls, as may be seen from FIG. 6. This has been found to be desirable since any pressure on the outer surfaces of the sheets which tend to affect the flow of the processing liquid just prior to the entry of the sheets between the pressure rolls tends to affect adversely the quality of the developed image in photosensitive sheet 38 or a positive print which may be formed by diffusion transfer in second sheet 40. This is particularly evident with respect to the formation of full color images.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Processing apparatus for use with a film unit of the type including a photosensitive sheet, a second sheet and a contained processing liquid adapted to be released under pressure and spread between said sheets as the latter are advanced through pressure-applying means, said apparatus comprising, in combination:
    (a) a pair of elongated, pressure-applying members having an entrance area into which said film unit is advanced with said sheets in superposed relation and lying substantially in a first plane defined by said entrance area;
    (b) an elongated guide member positioned closely adjacent said entrance area and including end portions having first surfaces adapted to be positioned in said first plane; and
    (c) edge-engaging means extending angularly across said first plane on each side of said guide member and urged toward engagement with outer lateral edge portions thereof;
    (d) the distance between the intersections of said edge-engaging means with said first plane being less than the width of said film unit, whereby marginal edge portions of said film unit are deformed out of said first plane by said edge-engaging means while the central portion is maintained in said first plane by said first surfaces of said end portions and said entrance area of said pressure-applying members.

2. Processing apparatus according to claim 1 wherein said pressure-applying members comprise a pair of pressure rolls.

3. Processing apparatus for use with a film unit of the type including a photosensitive sheet, a second sheet and a contained processing liquid adapted to be released under pressure and spread between said sheets as the latter are advanced through pressure-applying means, said apparatus comprising, in combination:

(a) a pair of elongated, juxtaposed, pressure rolls between which said film unit is advanced with said sheets in superposed relation for release and spreading of said processing fluid;
(b) an elongated guide member having a long axis substantially parallel with the bite of said pressure rolls and positioned closely adjacent thereto;
(c) end portions on said guide member having first surfaces positioned in a plane passing through said bite and perpendicular to a plane passing through the longitudinal axes of said pressure rolls;
(d) the central portion of said guide member, intermediate of said end portions, being disposed slightly away from the plane of said first surfaces; and
(e) edge-engaging means extending angularly across the plane of said first surfaces and urged toward resilient engagement with outer, lateral edge areas of said end portions;
(f) the distance between said lateral edge areas being slightly less than the width of said film unit, whereby, as the latter is advanced across said end portions, marginal edge portions thereof are deformed out of the plane of said first surfaces by said edge-engaging means.

4. The invention according to claim 3 wherein said edge-engaging means comprise a unitary spring element.

5. The invention according to claim 4 wherein said spring element is mounted upon said guide member on one side thereof and extends around said end portions, being urged toward contact with the latter at the outer, lateral edges thereof adjacent said first surfaces.

6. Processing apparatus for use with a film unit of the type including a photosensitive sheet, a second sheet and a contained processing liquid adapted to be released under pressure and spread between said sheets as the latter are advanced through pressure-applying means, said apparatus comprising, in combination:
(a) a pair of elongated, juxtaposed, pressure rolls between which said film unit is advanced with said sheets in superposed relation for release and spreading of said processing fluid;
(b) means defining a guide surface longitudinally adjacent the bite of said pressure rolls on the side thereof into which said film unit is advanced and extending laterally at least in areas adjacent the marginal edges of said film unit;
(c) the distance between the outer, marginal edges of said guide surface being slightly less than the width of said film unit; and
(d) edge-engaging means extending angularly across the plane of said guide surface and urged toward engagement with said marginal edges thereof, whereby the portion of said marginal edges of said film unit which extends beyond said marginal edges of said guide surface are deformed out of said plane and at an angle thereto by contact of said edge-engaging means with said marginal edges of said film unit.

7. The invention according to claim 6 wherein said guide surface extends laterally for a small distance in relation to the total width of said film unit adjacent the two marginal edge portions thereof which are advanced across said guide surface.

8. Processing apparatus for use with a film unit of the type including a photosensitive sheet, a second sheet and a contained processing liquid adapted to be released under pressure and spread between said sheets as the latter are advanced through pressure-applying means, said apparatus comprising, in combination:
(a) a pair of elongated, juxtaposed (pressure rolls between which said film unit is advanced with said sheets in superposed relation for release and spreading of said processing fluid;
(b) an elongated guide member having a long axis substantially parallel with the bite of said pressure rolls and positioned closely adjacent thereto;
(c) a leading edge on said guide member extending parallel with said bite and closer thereto than a plane tangent with said rolls and parallel with the longitudinal axes thereof;
(d) end portions on said guide member having first surfaces positioned in a plane passing through said bite and perpendicular to a plane passing through the longitudinal axes of said pressure rolls;
(e) edge-engaging means extending angularly across the plane of said first surfaces and urged toward resilient engagement with outer, lateral edge areas of said end portions;
(f) the distance between said lateral edge areas being slightly less than the width of said film unit, whereby, as the latter is advanced across said end portions, marginal edge portions thereof are deformed out of the plane of said first surfaces by said edge-engaging means.

9. Processing apparatus for use with a film unit of the type including a photosensitive sheet, a second sheet and a contained processing liquid adapted to be released under pressure and spread between said sheets as the latter are advanced through pressure-applying means, said apparatus comprising, in combination:
(a) a pair of elongated, juxtaposed, pressure rolls between which said film unit is advanced with said sheets in superposed relation for release and spreading of said processing fluid;
(b) means defining a guide surface longitudinally adjacent the bite of said pressure rolls on the side thereof into which said film unit is advanced and extending laterally at least in areas adjacent the marginal edges of said film unit;
(c) edge-engaging means lying substantially in first and second planes rotated from the plane of said guide surface in opposite directions about each of the outer, marginal edges thereof, and further rotated angularly with respect to each of said marginal edges, whereby, said first and second planes intersect the plane of said guide surface substantially at points on each of said marginal edges thereof; and
(d) means for urging said edge-engaging members toward contact with said edges of said guide surface at said points;
(e) the distance between said points being slightly less than the width of said film unit, whereby the marginal edges of said film unit which extend beyond said points are deformed out of the plane of said guide surface.

10. The invention according to claim 9 wherein said means for urging comprise a spring element extending around said marginal edges of said guide surface and bearing said edge-engaging means at the opposite extremities thereof.

11. The invention according to claim 9 wherein said points are located closely adjacent the portions of said marginal edges of said guide surface which are closest to said pressure rolls.

12. The invention according to claim 11 wherein said points are located closer to said bite than a plane tangent with said rolls and parallel with the longitudinal axes thereof.

13. The invention according to claim 12 wherein said edge-engaging means include flared portions facing away from said bite, thereby cooperating with said guide surfaces to define an entrance area for said marginal edges of said film unit to be advanced between said guide surface and said edge-engaging means.

References Cited by the Examiner

UNITED STATES PATENTS 3,165,039   1/1965   Downey _____ 95—13

JOHN M. HORAN, *Primary Examiner.*